United States Patent
Jiang et al.

(10) Patent No.: US 10,028,174 B2
(45) Date of Patent: Jul. 17, 2018

(54) STEERING OF ROAMING IN LTE AND LEGACY NETWORK ENVIRONMENT

(71) Applicant: MOBILEUM, INC., Santa Clara, CA (US)

(72) Inventors: John Yue Jun Jiang, Danville, CA (US); Laurent Dubesset, Magny les Hameaux (FR); David Gillot, Brussels (BE)

(73) Assignee: MOBILEUM, INC., Cupertino, CA (US)

( * ) Notice: Subject to any disclaimer, the term of this patent is extended or adjusted under 35 U.S.C. 154(b) by 43 days.

(21) Appl. No.: 14/424,406

(22) PCT Filed: Aug. 28, 2013

(86) PCT No.: PCT/US2013/057090
§ 371 (c)(1),
(2) Date: Feb. 26, 2015

(87) PCT Pub. No.: WO2014/036144
PCT Pub. Date: Mar. 6, 2014

(65) Prior Publication Data
US 2015/0257044 A1    Sep. 10, 2015

Related U.S. Application Data

(63) Continuation of application No. PCT/US2012/045780, filed on Jul. 12, 2012.
(Continued)

(51) Int. Cl.
*H04W 36/00* (2009.01)
*H04W 8/12* (2009.01)
(Continued)

(52) U.S. Cl.
CPC ....... *H04W 36/0022* (2013.01); *H04W 8/065* (2013.01); *H04W 8/12* (2013.01); *H04W 36/14* (2013.01); *H04W 36/24* (2013.01)

(58) Field of Classification Search
CPC ... H04W 36/0022; H04W 8/065; H04W 8/12; H04W 36/24; H04W 36/14
See application file for complete search history.

(56) References Cited

U.S. PATENT DOCUMENTS 7,072,651 B2    7/2006  Jiang et al.
7,693,506 B1 *  4/2010  Back .............. H04W 60/00
                                                455/432.1
(Continued)

FOREIGN PATENT DOCUMENTS

WO    WO 2011/083663 A1      7/2011
WO    WO 2011156274 A2 *    12/2011  ......... H04L 63/0407
WO    WO 2013/006805 A1      1/2013

OTHER PUBLICATIONS

International Search Report of PCT/US2013/057090 dated Dec. 6, 2013.
(Continued)

*Primary Examiner* — Kamran Afshar
*Assistant Examiner* — Minjung Kim
(74) *Attorney, Agent, or Firm* — Arent Fox LLP

(57) ABSTRACT

The present invention is directed towards a method and system for redirecting roaming network traffic in an LTE network. The method includes observing a registration process of a subscriber in a visited network. The method further includes sending one or more messages to the visited network to induce a re-registration attempt by the subscriber to another Radio Access Technology (RAT) network of the same visited network. The method further includes applying one or more legacy steering techniques to move the subscriber to a target visited network.

19 Claims, 6 Drawing Sheets

Related U.S. Application Data

(60) Provisional application No. 61/708,499, filed on Oct. 1, 2012, provisional application No. 61/694,095, filed on Aug. 28, 2012.

(51) Int. Cl.
*H04W 8/06* (2009.01)
*H04W 36/14* (2009.01)
*H04W 36/24* (2009.01)

(56) References Cited

U.S. PATENT DOCUMENTS

| | | | |
|---|---|---|---|
| 2006/0052113 A1 | 3/2006 | Ophir et al. | |
| 2007/0249338 A1* | 10/2007 | Schwalb | H04W 8/04 455/433 |
| 2010/0304718 A1* | 12/2010 | Cibula | H04W 24/08 455/412.1 |
| 2011/0022686 A1* | 1/2011 | Ding | H04W 8/12 709/219 |
| 2011/0217979 A1 | 9/2011 | Nas | |
| 2011/0295996 A1 | 12/2011 | Qiu et al. | |
| 2011/0319089 A1 | 12/2011 | Sharma et al. | |
| 2012/0157092 A1* | 6/2012 | Agretti | H04W 8/18 455/432.1 |
| 2012/0170548 A1 | 7/2012 | Rajagopalan et al. | |
| 2012/0203926 A1 | 8/2012 | Camp et al. | |
| 2012/0236824 A1* | 9/2012 | McCann | H04L 47/20 370/331 |
| 2014/0004854 A1* | 1/2014 | Veran | H04W 48/18 455/432.1 |

OTHER PUBLICATIONS

European Search Report of related European Patent Application No. 13 83 2867 dated May 12, 2016.

* cited by examiner

STEERING OF ROAMING IN LTE AND LEGACY NETWORK ENVIRONMENT

CROSS-REFERENCE TO RELATED APPLICATION

This application is a National Stage entry of International Application No. PCT/US2013/057090, filed Aug. 28, 2013, which claims priority to U.S. Provisional Patent Application No. 61/694,095 entitled STEERING OF ROAMING IN LTE AND LEGACY NETWORK ENVIRONMENT, filed on Aug. 28, 2012, and U.S. Provisional Patent Application No. 61/708,499, filed on Oct. 1, 2012. This application is also a continuation of PCT Application no. PCT/US2012/045780 entitled "NETWORK TRAFFIC REDIRECTION (NTR) IN LONG TERM EVOLUTION (LTE)" filed on Jul. 12, 2012. The previous patent applications are incorporated by reference herein in their entirety.

FIELD OF THE INVENTION

The present invention generally relates to telecommunication. More specifically, the invention relates to method and system for redirecting roaming traffic to preferred operators across multiple telecommunication networks.

BACKGROUND OF THE INVENTION

As telecommunication technology has progressed, numerous mobile communication standards have been developed. These standards are broadly categorized into second generation (2G), third generation (3G) and the future, fourth generation (4G) technologies. Examples of 2G/3G technologies include Global System for Mobile communications (GSM), General Packet Radio Service (GPRS), Enhanced Data rates for GSM Evolution (EDGE), Universal Mobile Telecommunications System (UMTS), and the like. The UMTS standard further evolved to LTE technology under the Third Generation Partnership Project (3GPP). LTE technology offers a wireless broadband system with higher data rates, lower latency, and higher spectrum efficiency.

To keep up with the competition, more and more operators are adapting the newer LTE technology standard. These network operators provide voice and data services to their own subscribers and to subscribers from other networks. When the network operator provides service to a subscriber from a foreign country, it is referred to as "international roaming". When the network operator provides service to a subscriber from another network in the same country, it is referred to as "domestic roaming."

An operator always has a preference for one or more operators over another set of operators. Various network operators have partnership agreements with each other that include more favorable roaming charges than non-partners receive. Partner networks are "preferred" networks for the network operator's subscriber to register with when roaming. Non-partner networks are "non-preferred" networks to the subscriber. Network operators can maximize their margins and the roamers can get more attractive roaming rates and services if roamers roam on their home mobile operator's preferred partner networks.

Over the last few years, the revenues to network operators from home subscribers have consistently declined due to increased competition and resulting pricing pressures. On the other hand, revenues from roamers have consistently grown in the same period due to increased mobile penetration in local markets and an increase in travel. Hence, protecting the existing roaming revenues and growing them further has become an important priority for the network operators worldwide.

Some operators also own networks in various countries. These operators would like to make sure their out-roamers stay within the group properties, or stay on preferred networks, in order to gain the best service experience even when roaming. They will also be able to offer geography based price plans (for example, a single rate all across Western Europe or South East Asia) to users who have subscribed to such plans. In addition, as new technologies like LTE keep rolling out, operators can control the rollout schedule across their own properties and also make sure interoperability issues are taken care of. Keeping roaming subscribers on preferred networks gives the best service experience to the subscriber. However, current methods of controlling which network a subscriber registers on when roaming have disadvantages.

One previous patent from the inventors of this application was directed towards a method and system for facilitating redirection of network traffic towards a preferred network. However, that patent was focusing on GSM network.

Another patent from the inventors was directed to a system and method facilitating redirection of network traffic across multiple networks including LTE and GSM. However, since in some cases the redirection to LTE network is not always successful but redirection is more successful within legacy Radio Access Technology network like 2G or 3G. Hence, there is a need in the art to have a system and method for facilitating redirection of network traffic in both LTE and legacy network environments.

SUMMARY

The present invention is directed towards a method and system for redirecting roaming network traffic in an LTE network. The method includes observing a registration process of a subscriber in a visited network. The method further includes sending one or more messages to the visited network to induce a re-registration attempt by the subscriber to another Radio Access Technology (RAT) network of the same visited network. The method further includes applying one or more legacy steering techniques to move the subscriber to a target visited network.

The present invention in another embodiment also provides a method for redirecting roaming network traffic in an LTE network. The method includes intercepting a Diameter registration request of a subscriber in a visited network. The method further includes sending InsertsubscriberDataRequest (IDR) message or Cancel Location Request (CLR) message network to the visited to induce a re-registration attempt by the subscriber to another Radio Access Technology (RAT) network of the same visited network. The method further includes sending MAP Process Unstructured SS Request and MAP Provide Subscriber Information messages followed by a MAP Cancel Location message to move the subscriber to a target visited network.

The present invention in another embodiment also provides a system for redirecting roaming network traffic in a telecommunication network. The system includes a Network Traffic Redirection (NTR) module that observes a registration process of a subscriber in a visited network. The NTR module further sends one or more messages to the visited network to induce a re-registration attempt by the subscriber to another Radio Access Technology (RAT) network of the same visited network. The NTR module further applies one or more legacy steering techniques to move the subscriber to a target visited network.

In accordance with various embodiments of the present invention, the NTR module is capable of steering roamers across LTE and non-LTE (GSM) networks. This solution of implementing NTR is hereinafter, interchangeably, referred to as NTR LTE or NTR solution.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system and a method for redirecting roaming traffic across multiple telecommunication networks. The general idea of this invention is to allow an operator to apply NTR solution across LTE and non-LTE (GSM) networks (hereinafter interchangeably referred to as "legacy networks"). The HPMN operator deploys an NTR module to implement the solution as described in the present invention. This module enables the operator to steer away its subscribers from a non-preferred VPMN to a preferred VPMN.

Figure 1:
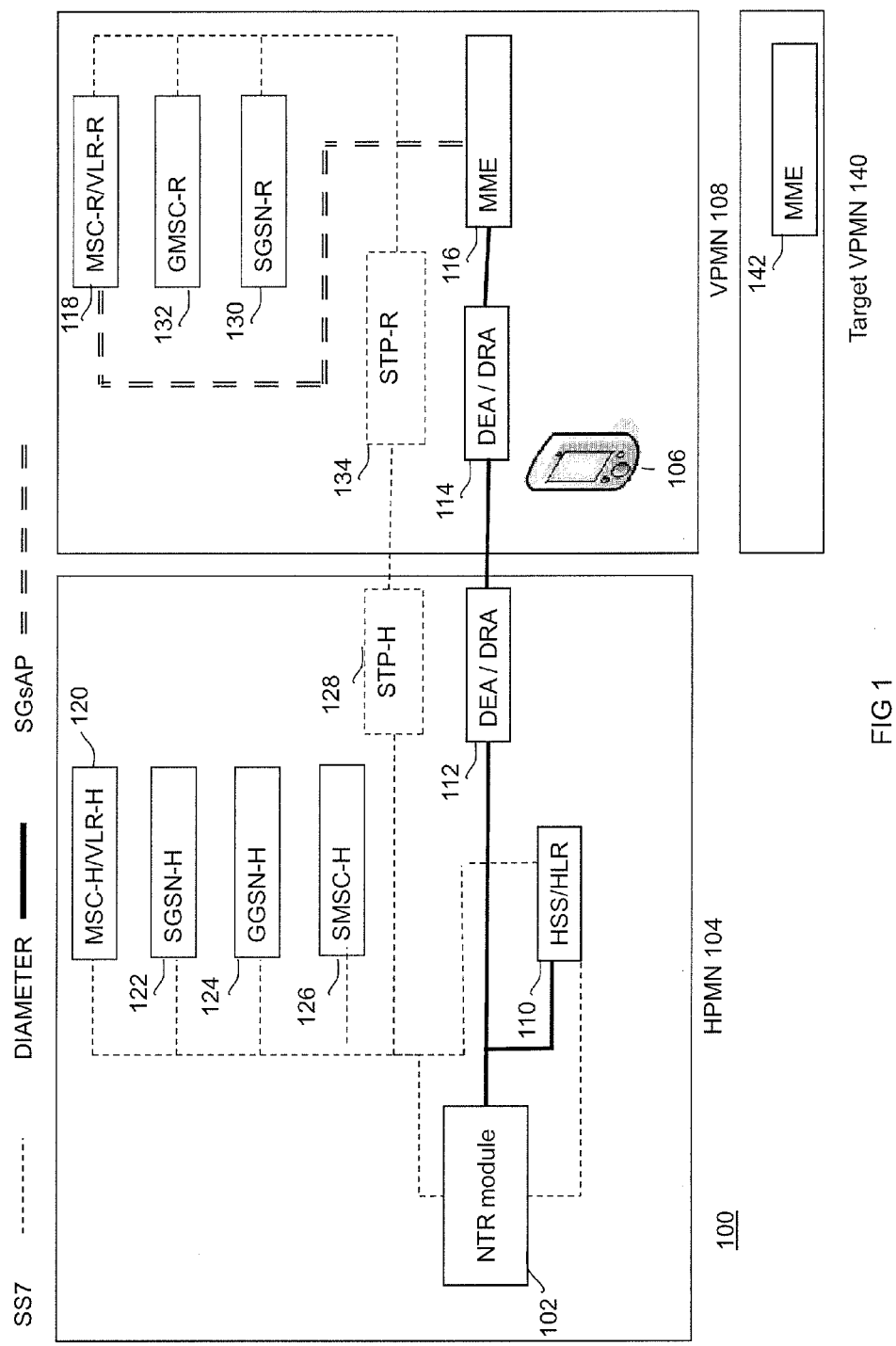
FIG. 1 illustrates a system for implementing the NTR in LTE solution, in accordance with an embodiment of the present invention.

In accordance with another embodiment of the present invention, a group of operators may deploy the NTR solution to steer their subscribers to a set of preferred operators. In such an embodiment, the NTR module is deployed at a centralized location that is connected to a host network. In its various implementation of the present invention, the NTR solution is implemented in monitoring mode or in-signaling mode FIG. 1 illustrates a system 100 that implements the NTR in LTE solution, in accordance with an embodiment of the present invention. NTR module 102 is deployed in HPMN 104 to apply traffic steering on its subscriber 106, who is roaming in a VPMN 108. This enables the operator in HPMN to be able to steer its subscribers to preferred operators in VPMN 108. For sake of representation, system 100 represents network elements from both LTE and GSM networks. HPMN 104 includes an HSS 110 that connects via a DEA/DRA 112 in HPMN 104 and a DEA/DRA 114 in VPMN 108 to an MME 116 in VPMN 108. The MME 116 is further connected to an MSC-R/VLR-R 118 in VPMN 108 via SGsAP protocol.

HPMN 105 further includes an MSC-H/VLR-H 120, an SGSN-H 122, a GGSN-H 124, an SMSC-H 126 and an STP-H 128. These network elements communicate with each other over a Signaling System 7 (SS7) link. System 100 further includes in VPMN 108 an SGSN-R 130, a GMSC-R 132, and an STP-R 134 that connects to STP-H 128 over SS7 link.

It will also be apparent to a person skilled in the art that HPMN 104 and VPMN 108 may also include various other network components (not shown in FIG. 1), depending on the architecture under consideration.

NTR module 102 connects with various components within HPMN 104 and VPMN 108 to implement the NTR solution for its roaming subscriber, like roamer 106. The primary objective of NTR module 102 is to be able to do SoR across multiple telecommunication networks and move roamer 106 to target visited network VPMN 140's MME 142.

Figure 2:
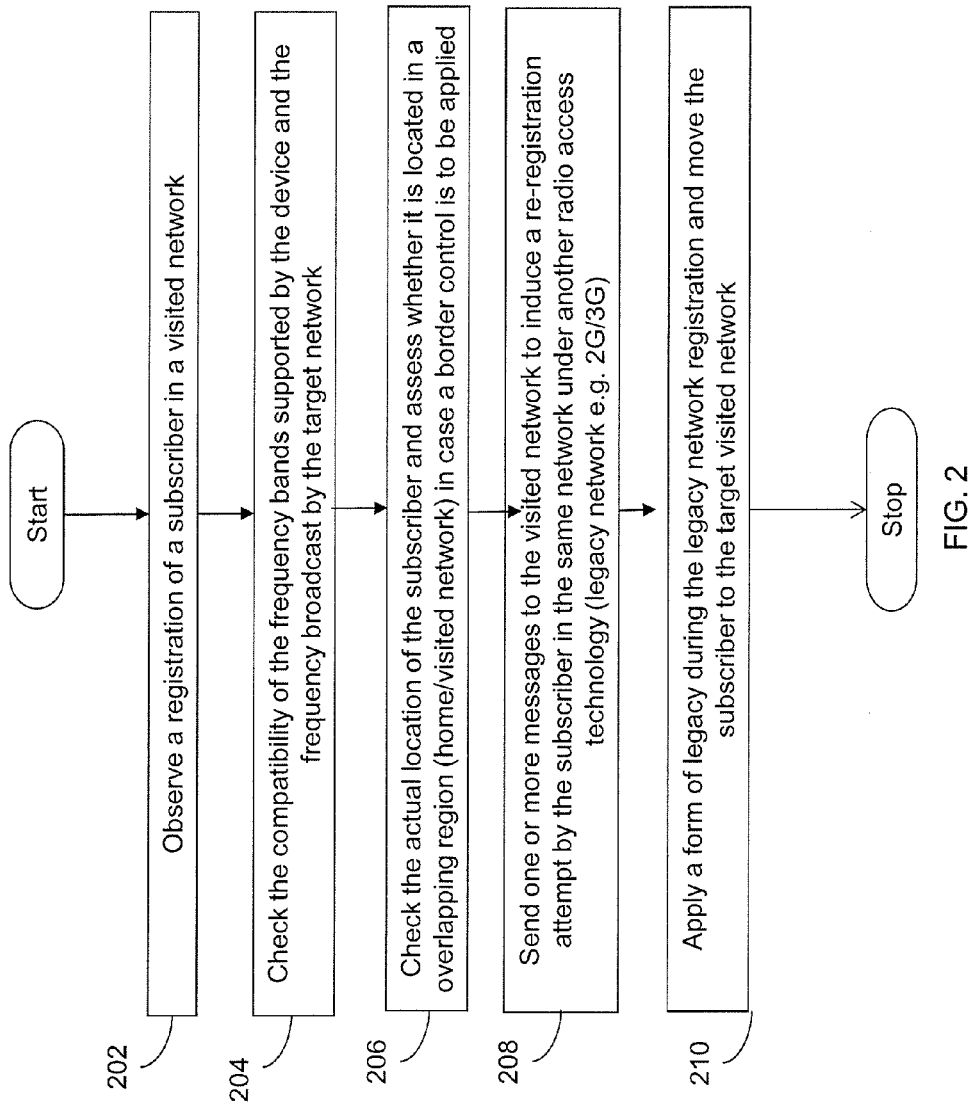
FIG. 2 represents a flowchart for redirecting roaming network traffic in a telecommunication network, in accordance with an embodiment of the present invention.

FIG. 2 represents a flowchart for redirecting roaming network traffic in a telecommunication network, in accordance with an embodiment of the present invention. It will be apparent to a person skilled in the art that various steps of the flowchart would be executed by the NTR module 102. At step 202, the NTR module 102 checks the compatibility of the frequency bands supported by the device and the frequency broadcast by target VPMN 140. At step 206, the NTR module 102 checks the actual location subscriber 106 and assesses whether it is located in an overlapping region (HPMN 104 and VPMN 108) in case a border control is applied. Subsequently, at step 208, the NTR module 102 sends one or more messages to the VPMN 108 to induce a re-registration attempt by the subscriber 106 in the same network under another RAT legacy network, e.g., 2G or 3G. Finally, at step 210, the NTR module 106 applies one or more legacy steering techniques to move the subscriber to target VPMN 140.

In one embodiment of the present invention, roamer 106 registers to an LTE network and the messages are Diameter messages. In one embodiment of the present invention, NTR module 102 sends these messages, while being deployed in monitoring mode. In another embodiment of the present invention, NTR module 102 sends these messages, while being deployed in in-signaling mode. In another embodiment of the present invention, at step 208, NTR module 102 sends the target visited network as current location information to the roamer 106 while being in VPMN 108 to induce a re-registration attempt by the roamer 106 to target visited network 140. These messages are sent directly to roamer 106's SIM card modifying the current location information stored with the identifiers of the target VPMN 140, to induce a re-registration attempt by the subscriber to the target VPMN 140.

Figure 3:
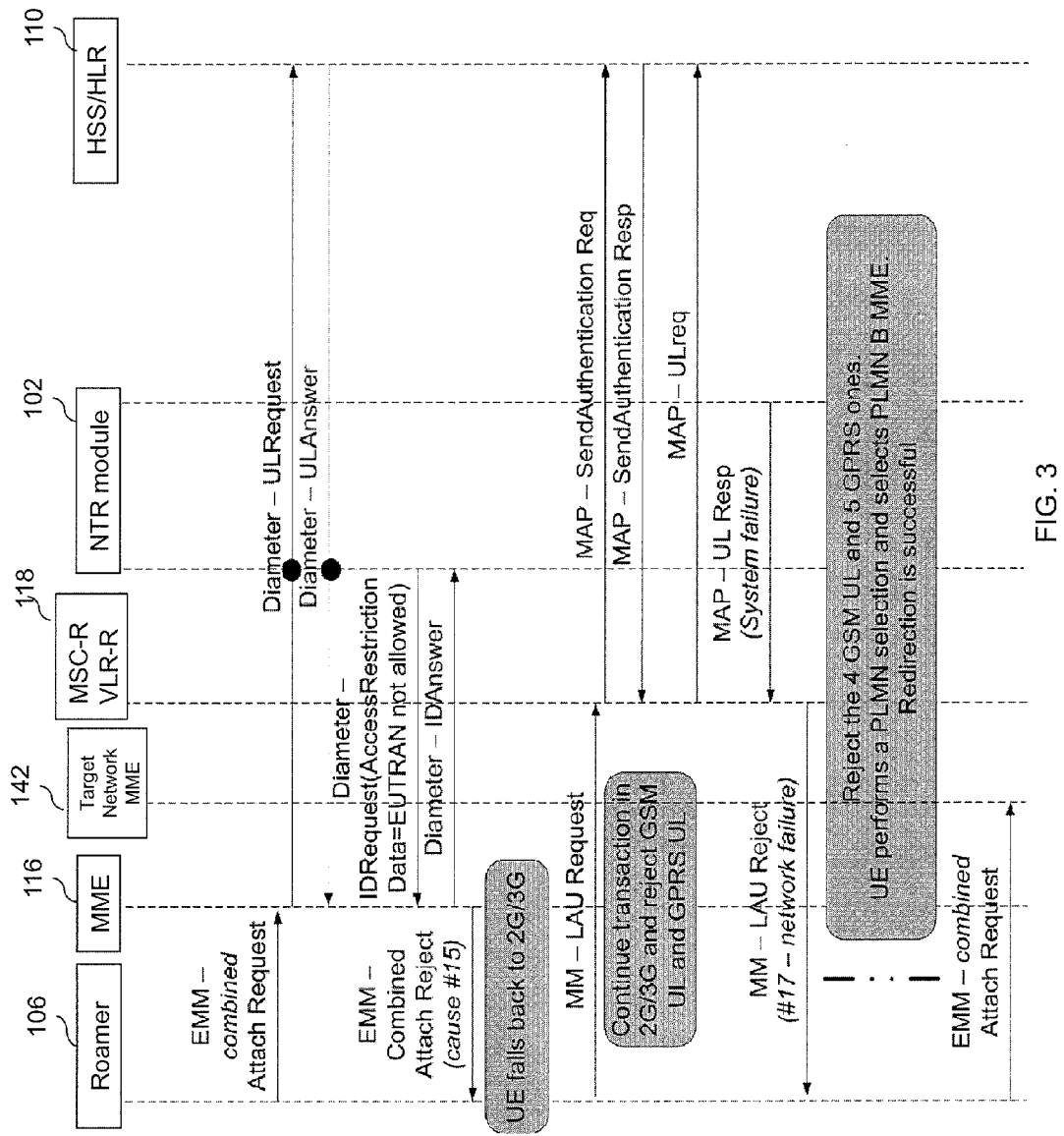
FIG. 3 represents a flow diagram for implementing NTR solution using an IDR message, in accordance with an embodiment of the present invention.

FIG. 3 represents a flow diagram for implementing NTR solution using an IDR message, in accordance with an embodiment of the present invention. In order to initiate registration to VPMN 108, roamer 106 sends an EMM Attach request to MME 116 in VPMN 108. MME 116 further sends a Diameter-Update Location Request towards HSS 110 of HPMN 104. In response, HSS 110 sends a Diameter-Update Location Accept to MME 116. Now before MME 116 confirms the registration roamer 106 by sending EMM Attach accept message to roamer 106, NTR module 102 attempts SoR to redirect the roamer 106 to another preferred LTE operator by sending Diameter IDR message to MME 116. The MME 116 acknowledges the message and returns Diameter ISD accept to NTR module 102. Thereafter, MME 116 sends EMM Combined attach Reject message (cause #15) to roamer 106 for ESM failure.

The roamer 106 now attempts to register to another RAT legacy network 2G or 3G within VPMN 108. Now, while the roamer 106 attempts to register to the legacy network, NTR module 102 uses one or more legacy steering techniques to move the roamer 106 to the target VPMN 140's MME 142. These legacy steering techniques involve NTR module 102 sending one or more MAP messages and rejecting roamer 106's four GSM LUP messages and forcing the roamer 106 to register to target VPMN 140.

Figure 4:
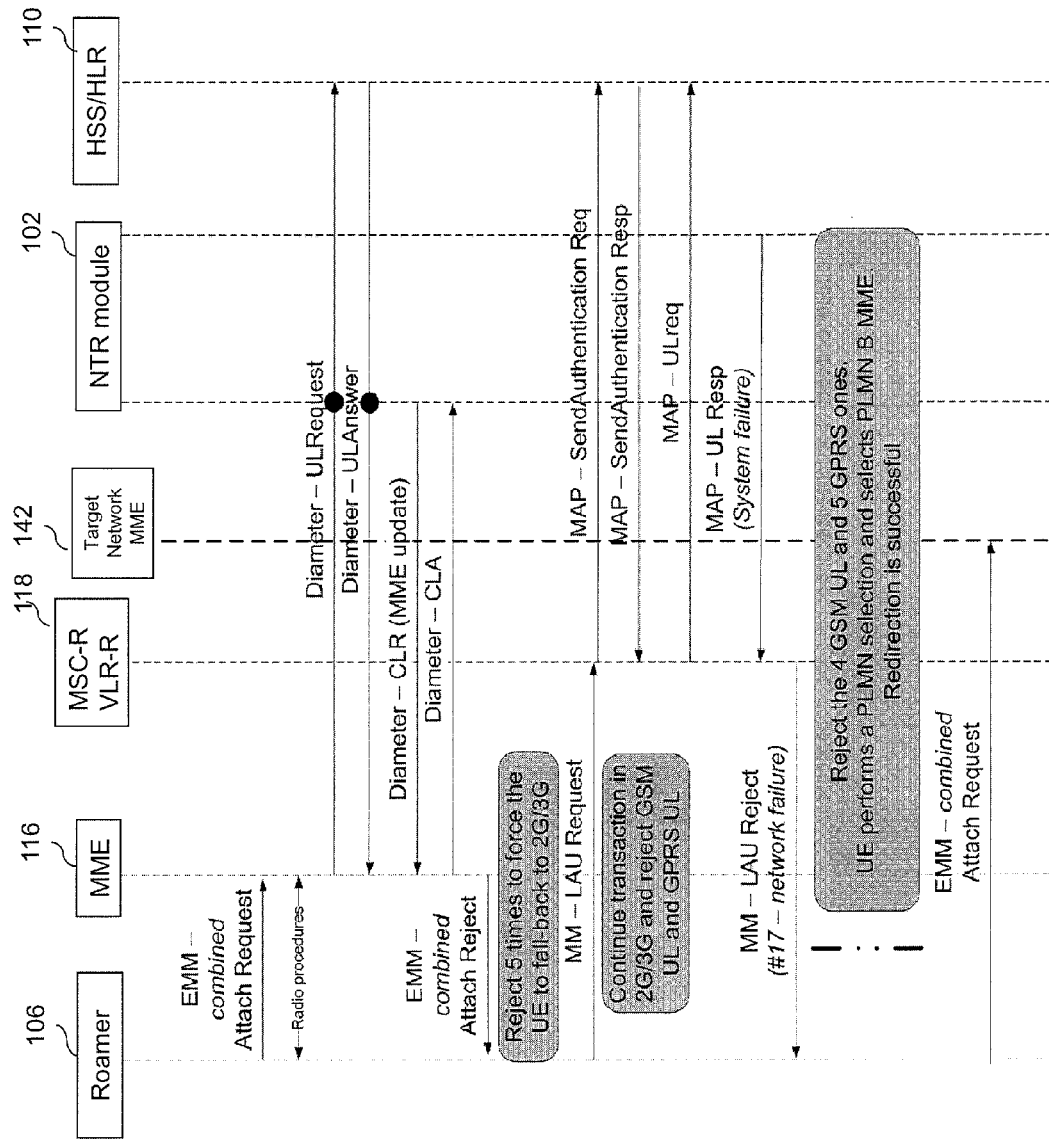
FIG. 4 represents a flow diagram for implementing NTR solution using a Cancel Location message, in accordance with an embodiment of the present invention.

FIG. 4 represents a flow diagram for implementing NTR solution using a Cancel Location Request (CLR) message, in accordance with an embodiment of the present invention. The call flow for this embodiment, is identical to FIG. 3 embodiment, except that NTR module 102 sends a Diameter Cancel Location Request to MME 116 with cancellation type as subscription withdrawn to force the roamer 106 to steer away from VPMN 106. Also, in this case when MME 116 sends an EMM Detach request it sends with an error code #7 for EPS not allowed. This rejection is repeated 5 times to force the roamer 106 to fall back on legacy network on another RAT like 2G or 3G. Subsequently, the NTR module 102 sends one or more MAP messages and rejects roamer 106's four GSM LUP message or five GPRS LU to force the roamer 106 to register to target VPMN 140.

Figure 5:
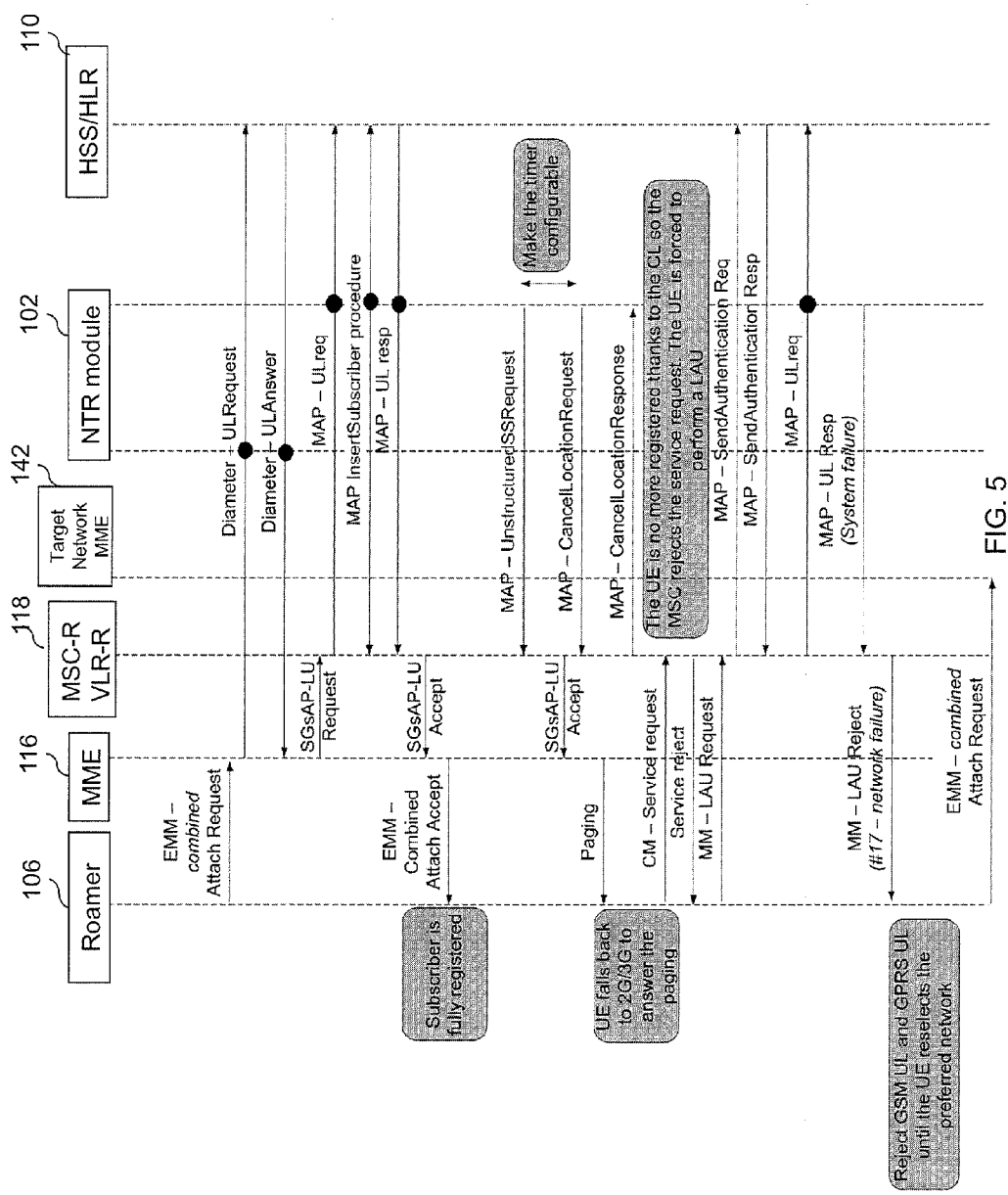
FIG. 5 represents a flow diagram for implementing NTR solution using a Process Unstructured SS Request (PUSSR) message, in accordance with an embodiment of the present invention.

FIG. 5 represents a flow diagram for implementing NTR solution using a Process Unstructured SS Request (PUSSR) message, in accordance with an embodiment of the present invention. In this case, when roamer 106 sends the EMM Attach request to MME 116 and subsequently the MME 116 sends a Diameter UL request, the subscriber roamer 106 is successfully registered to the LTE network in VPMN 108. Now, the NTR module sends MAP Process Unstructured SS Request message followed by MAP Cancel Location method after configurable timer to ensure that roamer 106 falls back to legacy network like 2G/3G. Moreover, the MSC 118 rejects the service request and the roamer 106 is forced to perform a LUP. The NTR module 102 then apply legacy SoR techniques using LUP reject until the roamer 106 is registered with target VPMN 140.

Figure 6:
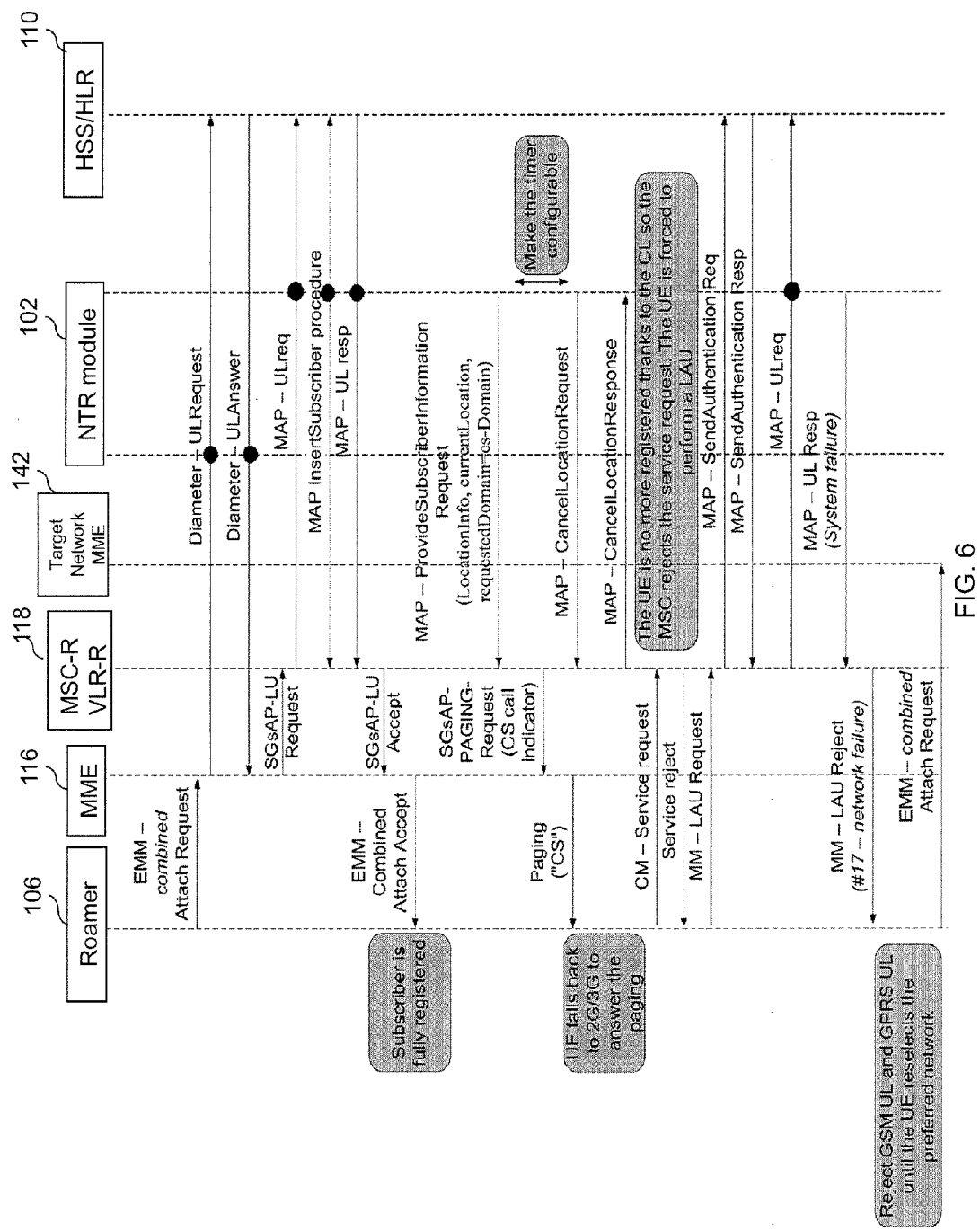
FIG. 6 represents a flow diagram for implementing NTR solution using a Provide Subscriber Information (PSI) message, in accordance with an embodiment of the present invention.

FIG. 6 represents a flow diagram for implementing NTR solution using a Provide Subscriber Information (PSI) message, in accordance with an embodiment of the present invention. Similar to FIG. 5, in this embodiment, NTR module 102 sends MAP PSI request message followed by MAP Cancel Location method after configurable timer to ensure that roamer 106 falls back to legacy network like 2G/3G. Moreover, the MSC 118 rejects the service request and the roamer 106 is forced to perform a LUP. The NTR module 102 then applies legacy SoR techniques using LUP reject until the roamer 106 is registered with target VPMN 140.

The Diameter LTE steering enables to control the radio access technology. In other words, it enables the deploying operator of favoring preferred partner or controlling the traffic distribution between networks but also between Radio Access Technologies (RAT).

The rejection of the Diameter Registration procedures results in various error codes in the radio interface of the mobile of roamer 106. In accordance with various embodiments of the present invention, the NTR module 102 is able to induce the following new error codes on the radio interfaces:

1. Cause #15 (no suitable cells in Tracking Area), #12 "tracking area not allowed", #13 "roaming not allowed in this tracking area and it forces the UE to reselect another RAT in the same PMN. The location area is added to the list of "forbidden LAs for roaming" which is stored in the mobile.
2. Cause #14 "EPS services not allowed in this PLMN" is received by the UE, the chosen PLMN identity shall be stored in the "forbidden PLMNs for GPRS service".
3. Cause #19, "ESM failure", the UE may set the attach attempt counter to 5 and directly attempt to register on another network.

The NTR module 102 also follows the usual rejection principles available in SS7 steering. For example, Cause #11 (PMN Not Allowed)

It forces the mobile UE (User Equipment) to perform a PMN reselection. The mobile UE shall store the PMN identity in the "forbidden PMN list" in the card and the UE shall no more reselect this PMN.

Cause #17 (Network Failure)—leading to additional registration re-attempts (up to 5 attempts) from the mobile before changing network.

Since the NTR solution intercepts the DIAMETER Update Location Request, it can respond with the correct Diameter Update Location Answer (Reject) leading to the expected radio error code and handset behavior.

The mapping table to be applied is Table 1, shown below.

TABLE 1

| Diameter Reject Cause | Radio Error cause |
| --- | --- |
| DIAMETER_ERROR_UNKNOWN_EPS_SUBSCRIPTION | #15 "No suitable cells in tracking area" |
| DIAMETER_AUTHORIZATION_REJECTED (5003) | #15 "No suitable cells in tracking area" |
| DIAMETER_ERROR_RAT_NOT_ALLOWED (5421) | #15 "No suitable cells in tracking area", or #13 "Roaming not allowed in this tracking area", or #12 "Tracking area not allowed" Note - the cause selection is an operator's choice |
| DIAMETER_ERROR_ROAMING_NOT_ALLOWED (5004) | #11 "PLMN not allowed" |

TABLE 1-continued

| Diameter Reject Cause | Radio Error cause |
| --- | --- |
| DIAMETER_UNABLE_TO_COMPLY (5012), DIAMETER_INVALID_AVP_VALUE (5004) | #17 "Network failure" |
| DIAMETER - Roaming restricted in MME due to unsupported feature, in of the Subscription-Data, part of the Update Location Answer | #14 "EPS services not allowed in this PLMN" |
| OPERATOR_DETERMINED_BARRING is received in the Subscriber-Status AVP, part of the Update Location Answer | #19 "ESM failure" |

In yet another embodiment of the present invention, the NTR module 102 performs OTA based steering. There are some mobile devices which do not maintain an SMS stack in LTE networks. Hence, they need an applet to open an IP channel for specific events. For example, the SIM card in the handset may detect the entry in a new PMN or handset may restart. In such a scenario, the SIM card may open an IP channel with OTA server. The OTA server may then request for a dynamic preference list. This request is intercepted by the NTR module 102. At this stage, the NTR module 102 sends the list of preferred networks where it wants to steer its subscriber. The NTR module 102 sends the current location information stored with the identifiers of the target VPMN 140, to induce a re-registration attempt by the roamer 106 to target VPMN 140. Upon receiving the list, the OTA server sends relevant EF files to the handset.

In accordance with various other embodiment of the present invention, the NTR module 102 is also able to redirect network traffic across multiple networks from different RAT. E.g. NTR solution can steer a roamer from LTE to GSM or vice versa.

In the context of coexistence of LTE with pre-LTE technology, the mobility management of outbound roamers may happen in different fashions, from a core network perspective:

- EPS only registration i.e. the registration is entirely happening between the MME and HSS.
- EPS and non-EPS registration for CSFB i.e. the registration happens between the MME-HSS and MSC/VLR-HLR.
- non-EPS registration i.e. the registration happens between the MSC/VLR-HLR and the SGSN-HLR.

One challenge of the previous steering solution is to identify the current registration status of the subscriber. In other words, the NTR solution determines whether the subscriber is attached to an E-UTRAN or UTRAN/GERAN network access.

This information is required to correctly apply the rejection principles linked to the observed GSM UL. In some cases, GSM UL may happen for combined EPS/Non-EPS registration but also as a standalone scenario, in case of MO/MT call occurring under a new coverage area. It is therefore required to identify in the scenario of the subscriber as a GSM UL does not provided any information.

In specific scenario of 'Circuit-Switched Fallback' (CSFB), the legacy (GSM) and evolved core network protocol (LTE), MAP and Diameter, respectively coexist. When a registration process including CSFB happens, the order of messages observed at HSS/HLR is fully determined. The GSM UL registration only happens after a successful Diameter UL procedure (ULR/ULA).

In other words, observed messages will follow the sequence:
1. Diameter ULR
2. Diameter ULA (assumed successful)
3. GSM UL
4. ISD/ISD ACK
5. GSM UL ACK Now if standard SoR is applied on MAP it would mark the Diameter registration as successful but with failure on non-EPS domain. This would lead to ineffective SoR or new steering attempts but with counter rules associated with the EPS domain and not the GSM domain. This misleads the NTR module that would assume a possible manual registration of the subscriber. The observed behavior will vary on handset type (data- or voice-centric), but would be likely to end up in an ineffective steering of roaming action.

It should be obvious for a person skilled in the art that an independent MAP based NTR platform is likely to interfere with the MAP message as it would be unaware of a previous Diameter registration. This would affect negatively the user experience at a time of a call activity. Hence, the NTR solution of the present invention is enhanced with Diameter-handling capabilities like the NTR solution must have information about the two sets of registration procedures (Diameter and MAP).

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in Table 2 below as a reference.

TABLE 2

| GSM MAP | ANSI-41D |
| --- | --- |
| Location Update/ISD | REGNOT |
| Cancel Location | REGCAN |

TABLE 2-continued

| GSM MAP | ANSI-41D |
|---|---|
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

APPENDIX

| Acronym | Description |
|---|---|
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DEA | Diameter Edge Agent |
| DRA | Diameter Routing Agent |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |

| Acronym | Description |
|---|---|
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

Technical References

The entirety of each of the technical references listed below is incorporated by reference herein.

| | |
|---|---|
| Between AS and SLF | 3GGP TS 29.328 & TS 29.329 |
| Between AS and OFCS | RFC 4006, 3GGP TS 32.225 & TS 32.299 |
| Between AS and OCS | RFC 4006, 3GGP TS 32.225 & TS 32.299 |
| Between OCF and Rating function | 3GPP TS 32.296 |
| Between CSCF and HSS | 3GPP TS 29.228 & TS29.229 |
| Between CSCF and SLF | 3GPP TS 29.228 & TS29.229 |
| Between PCRF and SPR | 3GPP TS 23.203, TS 29.328 & TS 29.329 |
| Between AF and the PCRF | 3GPP TS 23.203 & TS 29.214 |
| Rx reference point for EPC | 3GPP TS 32820, 3GPP TS 23.203 & TS 29.214 |
| Between PCEF and the PCRF | 3GPP TS 29.212 & TS 23.203 |
| Between OCS and PCEF | 3GPP TS 32.29, TS 32.251 & RFC 4006 |
| Between PCEF and OFCS | 3GPP TS 32.240, TS 32.295 |
| Between AF and PDF | 3GPP TS 29.209 |
| Between Packet Domain and an external packet data network | 3GPP TS 29.061 |
| between the EPC based PLMN and the packet data network | 3GPP TS 29.061 |
| Between BSF and HSS | 3GPP TS 29.109 & TS 33.220 |
| Between BSF and SLF | 3GPP TS 29.109 & TS 33.220 |
| Between BSF and NAF | 3GPP TS 29.109 & TS 33.220 |
| Between BSF and Zn Proxy | 3GPP TS 29.109 & TS 33.220 |
| Between the 3GPP AAA Server and an SLF | 3GPP TS 29.234 |
| Between the WLAN AN and the 3GPP AAA Proxy | 3GPP TS 29.234 |
| Between the 3GPP AAA Proxy and 3GPP AAA Server | 3GPP TS 29.234 |
| Between the 3GPP AAA Server and the HSS | 3GPP TS 29.234 |
| Between the 3GPP AAA Server and the PDG | 3GPP TS 29.234 |
| Between the 3GPP AAA Server/Proxy and the WAG | 3GPP TS 29.234 |
| Between the 3GPP AAA Server and the PNA | 3GPP TS 29.234 |
| Between the 3GPP AAA Server and the PDG | 3GPP TS 29.234 |
| Between GGSN and BM-SC | 3GPP TS 29.061 |
| Mz is the roaming variant of the Gmb reference point with the same functionality | 3GPP TS 29.061 |
| CCF to BS | 3GPP TS TS 32.225 |
| Multimedia Messaging Service (MMS) | OMA MM10 interface |
| Between AGW and PCRF | 3GPP2 TSG-X X.S0013-014 |
| Between AF and PCRF | 3GPP2 TSG-X X.S0013-013 |
| Between MME and HSS | 3GPP TS 29.272 |
| Between the 3GPP AAA Server/Proxy and the PDN GW | 3GPP TS 23402 |
| Between MME and HSS | 3GPP TS 29.272 |
| Transfer of (QoS) policy information from PCRF to the S-GW. | 3GPP TS 32820, TS 23402 |
| Between PCRF in the HPLMN (H PCRF) and a PCRF in the VPLMN (V PCRF) | 3GPP TS 23.203 & TS 29.215 |
| Between MME and EIR | 3GPP TS 29.272 |
| PCRF and the BBERF | 3GPP TS 23.203 |
| Between ePDG and vPCRF | 3GPP TS 23.203 |
| PCRF and the BBERF | 3GPP TS 23.203 |
| Between an un-trusted non-3GPP IP access and the 3GPP AAA Server/Proxy | 3GPP TS 23402 |
| Between the 3GPP AAA Proxy and 3GPP AAA Server | 3GPP TS 23402 |
| Between Untrusted Non-3GPP IP Access and ePDG | 3GPP TS 23402 |
| Between the 3GPP AAA Server/Proxy and the ePDG | 3GPP TS 23402 |
| Between the 3GPP AAA Server and the HSS | 3GPP TS 23402 |
| Between a trusted non-3GPP IP access and the 3GPP AAA Server/Proxy | 3GPP TS 23402 |
| Between the 3GPP AAA Server and the HA | 3GPP TS 23402 |

The invention claimed is:

1. A method for redirecting roaming network traffic in a Long Term Evolution (LTE) network, the method comprising:
observing, by a home public mobile network associated with a subscriber, a registration process of the subscriber in a first Radio Access Technology (RAT) network within a non-preferred visited public mobile network;
before the subscriber registers in the first RAT network, repeatedly sending, by the home public mobile network, a plurality of messages to the non-preferred visited public mobile network that induces a re-registration attempt by the subscriber to a second RAT network within the non-preferred visited public mobile network, the second RAT network being a different type of network than the first RAT network;

while the subscriber attempts to register to the second RAT network within the non-preferred visited public mobile network, sending, by the home public mobile network, one or more messages to the non-preferred visited public mobile network to prevent the subscriber from registering in the second RAT network, such that the home public mobile network can steer the subscriber to a target visited public mobile network while the home public mobile network is preventing the subscriber from registering in the second RAT network; and applying, by the home public mobile network, one or more steering techniques to force the subscriber to register with the target visited public mobile network that is different than the non-preferred visited public mobile network.

2. The method of claim 1, wherein the plurality of messages comprise at least one Diameter message selected from a group consisting of an InsertsubscriberDataRequest (IDR) message and a Cancel Location Request (CLR) message.

3. The method of claim 1, wherein the plurality of messages comprise at least one Mobile Application Part (MAP) message selected from a group consisting of a MAP Process Unstructured Supplementary Services (SS) Request and a MAP Provide Subscriber Information message, followed by a MAP Cancel Location message.

4. The method of claim 1, wherein sending of the one or more messages further comprises: sending a message to a card of the subscriber modifying current location information stored with identifiers of the target visited public mobile network to force a registration attempt by the subscriber to the target visited public mobile network.

5. The method of claim 4, wherein information about the target visited public mobile network is sent in response to an applet on a handset of the subscriber being able to detect an item selected from a group consisting of roaming, network registration change, handset start, and activation timer, and being able to open a communication channel to obtain a list of networks.

6. The method of claim 1, wherein the registration process is between a Mobility Management Entity (MME) in the target visited public mobile network and a Home Subscriber Server (HSS) of a home network of the subscriber.

7. The method of claim 1, wherein the plurality of messages are sent to a Mobility Management Entity (MME) or a Mobile Switching Center (MSC)/Visited Location Register (VLR) corresponding to the non-preferred visited public mobile network.

8. The method of claim 1, further comprising:
identifying, prior to the sending the plurality of messages, a location of the subscriber in the non-preferred visited public mobile network; and
determining, based on the location, whether the subscriber is in a region where a radio coverage of a home network overlaps a radio coverage of the non-preferred visited public mobile network.

9. The method of claim 1, further comprising:
assessing a compatibility of supported frequencies of a device of the subscriber and frequencies broadcast by the target visited public mobile network.

10. A non-transitory computer-readable medium storing computer executable code for redirecting roaming network traffic in a Long Term Evolution (LTE) network, comprising:
code for causing a computer to:
observe, by a home public mobile network associated with a subscriber, a registration process of the subscriber in a first Radio Access Technology (RAT) network within a non-preferred visited public mobile network;

before the subscriber registers in the first RAT network, repeatedly send, by the home public mobile network, a plurality of messages to the non-preferred visited public mobile network that induces a re-registration attempt by the subscriber to a second RAT network within the non-preferred visited public mobile network, the second RAT network being a different type of network than the first RAT network;

while the subscriber attempts to register to the second RAT network within the non-preferred visited public mobile network, send, by the home public mobile network, one or more messages to the non-preferred visited public mobile network to prevent the subscriber from registering in the second RAT network, such that the home public mobile network can steer the subscriber to a target visited public mobile network while the home public mobile network is preventing the subscriber from registering in the second RAT network; and apply, by the home public mobile network, one or more steering techniques to force the subscriber to register with the target visited public mobile network that is different than the non-preferred visited public mobile network.

11. The non-transitory computer-readable medium of claim 10, wherein at least one of the plurality of messages is selected from a group consisting of an InsertsubscriberDataRequest (IDR) message, a Cancel Location Request (CLR) message, a Mobile Application Part (MAP) Process Unstructured Supplementary Services (SS) Request, and MAP Provide Subscriber Information messages followed by a MAP Cancel Location message.

12. The non-transitory computer-readable medium of claim 10, wherein at least one of the one or more messages is sent to a card of the subscriber modifying current location information stored with identifiers of the target visited public mobile network to force a registration attempt by the subscriber to the target visited public mobile network.

13. The non-transitory computer-readable medium of claim 12, wherein information about the target visited public mobile network is sent in response to an applet on a handset of the subscriber being able to detect an item selected from a group consisting of roaming, network registration change, handset start, and activation timer, and being able to open a communication channel to obtain a list of networks.

14. The non-transitory computer-readable medium of claim 10, wherein the registration process is between a Mobility Management Entity (MME) in the target visited public mobile network and a Home Subscriber Server (HSS) of a home network of the subscriber.

15. The non-transitory computer-readable medium of claim 10, wherein the plurality of messages are sent to a Mobility Management Entity (MME) or a Mobile Switching Center (MSC)/Visited Location Register (VLR) corresponding to the non-preferred visited public mobile network.

16. The non-transitory computer-readable medium of claim 10, further comprising:

code for causing the computer to:
  identify, prior to sending the plurality of messages, a location of the subscriber in the non-preferred visited public mobile network, and
  determine, based on the location, determines whether the subscriber is in a region where a radio coverage of the home network overlaps a radio coverage of the non-preferred visited public mobile network.

17. The non-transitory computer-readable medium of claim 10, further comprising:
code for causing the computer to:
  assess a compatibility of supported frequencies of a device of the subscriber and frequencies broadcast by the target visited public mobile network.

18. A method for redirecting roaming network traffic in a Long Term Evolution (LTE) network, the method comprising:
  observing, by a home public mobile network associated with a subscriber, a registration process of the subscriber in a first Radio Access Technology (RAT) network within a non-preferred visited public mobile network;
  before the subscriber registers in the first RAT network, repeatedly sending, by the home public mobile network, a plurality of messages to the non-preferred visited public mobile network that induces a re-registration attempt by the subscriber to a second RAT network within the non-preferred visited public mobile network, the second RAT network being a different type of network than the first RAT network;
  while the subscriber attempts to register to the second RAT network within the non-preferred visited public mobile network, sending, by the home public mobile network, one or more messages to the non-preferred visited public mobile network to prevent the subscriber from registering in the second RAT network, such that the home public mobile network can steer the subscriber to a target visited public mobile network; and
  applying, by the home public mobile network, one or more steering techniques to force the subscriber to register with the target visited public mobile network that is different than the non-preferred visited public mobile network.

19. The method of claim 18, further comprising steering, by the home public mobile network, the subscriber to the target visited public mobile network before the subscriber registers in the first and the second RAT networks.

* * * * *